(12) United States Patent
Van Buynder et al.

(10) Patent No.: US 10,442,102 B2
(45) Date of Patent: Oct. 15, 2019

(54) MACHINES AND METHODS FOR CUTTING PRODUCTS TO PRODUCE REDUCED-SIZE PRODUCTS THEREFROM

(71) Applicant: Urschel Laboratories, Inc., Chesterton, IN (US)

(72) Inventors: Luc Van Buynder, Bellem (BE); Nicholas Alan Underwood, Valparaiso, IN (US); Shawn Christopher Boylstein, Laporte, IN (US); Mark Allen Martin, Kouts, IN (US); James A. Fant, Chesterton, IN (US); Michael Scot Jacko, Valparaiso, IN (US)

(73) Assignee: Urschel Laboratories, Inc., Chesterton, IN (US)

( * ) Notice: Subject to any disclaimer, the term of this patent is extended or adjusted under 35 U.S.C. 154(b) by 233 days.

(21) Appl. No.: 15/411,172

(22) Filed: Jan. 20, 2017

(65) Prior Publication Data

US 2017/0232630 A1     Aug. 17, 2017

Related U.S. Application Data

(63) Continuation-in-part of application No. 15/142,969, filed on Apr. 29, 2016.

(Continued)

(51) Int. Cl.
*B26D 7/06*     (2006.01)
*B26D 3/28*     (2006.01)
(Continued)

(52) U.S. Cl.
CPC ......... *B26D 7/0691* (2013.01); *A23N 15/12* (2013.01); *B26D 1/03* (2013.01); *B26D 1/143* (2013.01);
(Continued)

(58) Field of Classification Search
CPC ......... B26D 7/06; B26D 7/0691; B26D 7/26; B26D 7/2614; B26D 7/2621;
(Continued)

(56) References Cited

U.S. PATENT DOCUMENTS 2,333,576 A * 11/1943 Kerr .................. A23N 15/12
                                                     198/382
2,376,062 A * 5/1945 Kerr .................. A23N 15/12
                                                     83/409.1
(Continued)

*Primary Examiner* — Andrea L Wellington
*Assistant Examiner* — Richard D Crosby, Jr.
(74) *Attorney, Agent, or Firm* — Hartman Global IP Law; Gary M. Hartman; Domenica N. S. Hartman

(57) ABSTRACT

Machines and methods suitable for performing cutting operations on products to yield a reduced-size product, for example, slicing and strip-cutting elongate food products. Such a method includes simultaneously delivering products to annular-shaped cavities of a rotating impeller. The products are simultaneously delivered with a feed unit that has a feed chute extension that protrudes into an interior of the impeller. The feed chute extension defines feed chutes that are aligned with the annular-shaped cavities of the impeller and direct the products to circumferential series of pockets within the annular-shaped cavities. The products are held within the pockets by centrifugal force as the products are carried past a slicing knife to form a first longitudinal cut through each of the products during a rotation of the impeller and to produce therefrom a substantially longitudinally sliced product.

14 Claims, 17 Drawing Sheets

Related U.S. Application Data

(60) Provisional application No. 62/155,909, filed on May 1, 2015.

(51) Int. Cl.
    *B26D 1/143*         (2006.01)
    *B26D 1/03*          (2006.01)
    *A23N 15/12*        (2006.01)

(52) U.S. Cl.
    CPC .............. *B26D 3/28* (2013.01); *B26D 7/0641* (2013.01); *B26D 2210/02* (2013.01)

(58) Field of Classification Search
    CPC .......... B26D 7/0461; B26D 2007/2607; B65G 47/1421; A23N 15/12
    See application file for complete search history.

(56) References Cited

U.S. PATENT DOCUMENTS

| | | | | |
|---|---|---|---|---|
| 2,758,697 A * | 8/1956 | Schultz | A23N 15/12 | 198/382 |
| 3,216,431 A * | 11/1965 | White | B65G 49/0427 | 134/132 |
| 3,521,688 A * | 7/1970 | Urschel | B26D 3/18 | 83/165 |
| 3,655,033 A * | 4/1972 | Lynch | B65G 27/00 | 198/757 |
| 3,857,310 A * | 12/1974 | Tiby | B26D 1/25 | 209/638 |
| 4,041,822 A * | 8/1977 | Gabel | B26D 1/15 | 144/245.3 |
| 4,150,751 A * | 4/1979 | Romagnoli | B65G 47/1421 | 198/757 |
| 4,206,671 A * | 6/1980 | Hoehn | B26D 1/02 | 198/676 |
| 4,625,606 A * | 12/1986 | Pinegar | B26D 3/22 | 83/403 |
| 4,873,105 A * | 10/1989 | Coppolani | A23N 15/12 | 426/481 |
| 5,129,299 A * | 7/1992 | Fischer | B26D 3/22 | 83/121 |
| 5,144,887 A * | 9/1992 | Mietzel | A23N 15/12 | 99/636 |
| 5,163,563 A * | 11/1992 | Coppolani | B07B 1/185 | 209/288 |
| 6,346,288 B1 * | 2/2002 | Nakada | A23N 15/12 | 426/481 |
| 6,883,411 B2 * | 4/2005 | Arrasmith | B26D 1/02 | 416/187 |
| 6,895,846 B2 * | 5/2005 | Walker | B26D 1/02 | 83/403 |
| 7,000,518 B2 * | 2/2006 | Bucks | B26D 1/29 | 83/402 |
| 7,386,970 B2 * | 6/2008 | Richwine | B01L 3/0241 | 53/247 |
| 8,893,996 B1 * | 11/2014 | Braunschweig | B02C 13/282 | 241/248 |
| 9,380,805 B2 * | 7/2016 | Holcomb | B26D 1/38 | |
| 9,675,089 B2 * | 6/2017 | Sammel | A22C 17/0033 | |
| 9,855,669 B2 * | 1/2018 | Klockow | B26D 7/18 | |
| 2003/0188615 A1 * | 10/2003 | Ripley | B65H 29/242 | 83/152 |
| 2004/0139706 A1 * | 7/2004 | Drebing | B26D 1/16 | 53/540 |
| 2005/0279228 A1 * | 12/2005 | Julian | B26D 1/26 | 99/537 |
| 2008/0134850 A1 * | 6/2008 | Bates | B26D 1/03 | 83/15 |
| 2009/0025519 A1 * | 1/2009 | Nanney | B26D 3/005 | 83/23 |
| 2009/0145306 A1 * | 6/2009 | Bearson | A22C 17/0033 | 99/355 |
| 2011/0293797 A1 * | 12/2011 | Pryor | A23N 15/003 | 426/231 |
| 2016/0207213 A1 * | 7/2016 | Martin | B26D 1/03 | |
| 2016/0318201 A1 * | 11/2016 | Underwood | B26D 7/0691 | |
| 2017/0232630 A1 * | 8/2017 | Underwood | B26D 7/0691 | 83/44 |
| 2018/0200911 A1 * | 7/2018 | Borgmann | B26D 7/2635 | |

\* cited by examiner

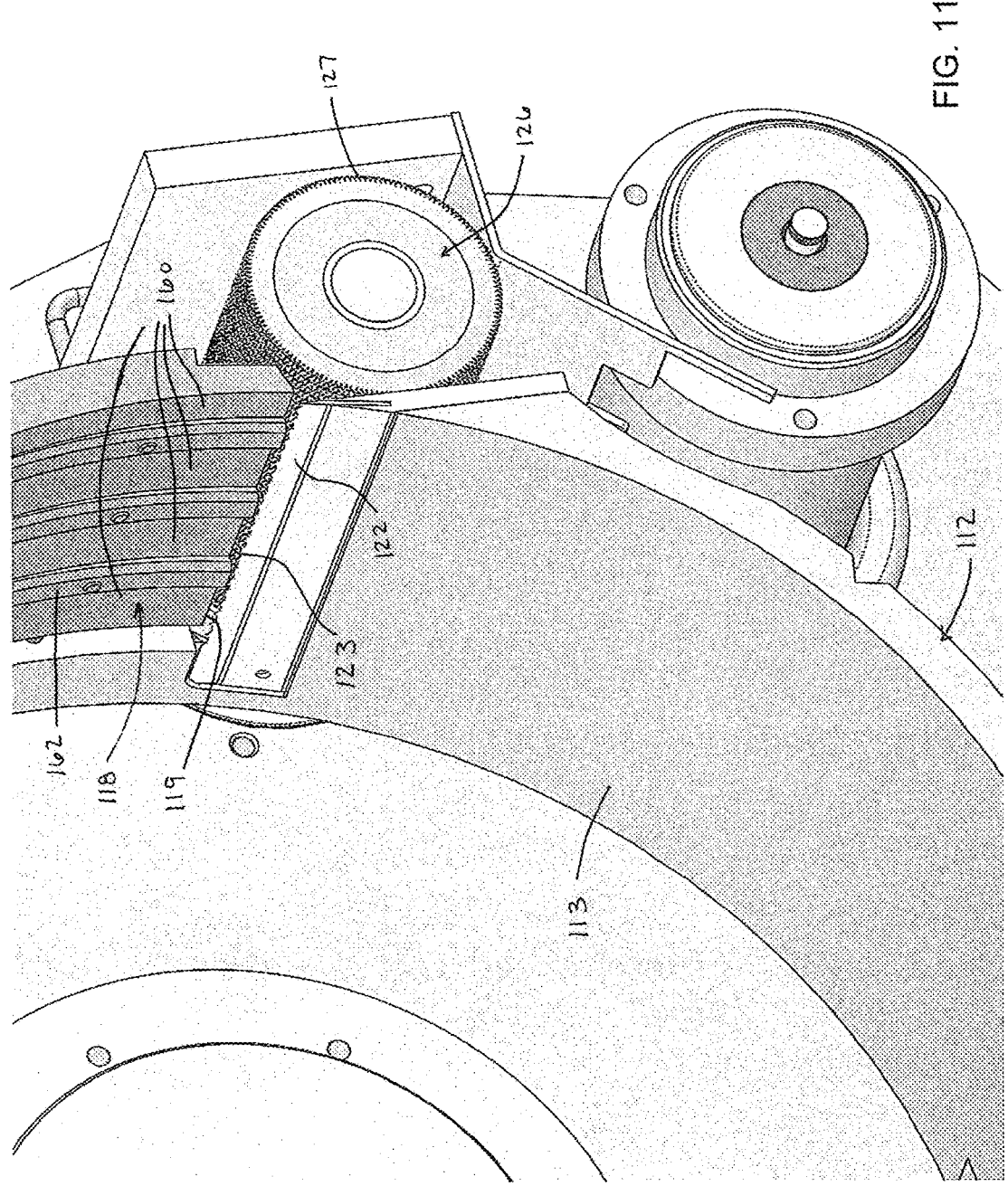

MACHINES AND METHODS FOR CUTTING PRODUCTS TO PRODUCE REDUCED-SIZE PRODUCTS THEREFROM

CROSS REFERENCE TO RELATED APPLICATIONS

This is a continuation-in-part patent application of co-pending U.S. patent application Ser. No. 15/142,969, filed Apr. 29, 2016, which claims the benefit of U.S. Provisional Application No. 62/155,909, filed May 1, 2015. The contents of these prior applications are incorporated herein by reference.

BACKGROUND OF THE INVENTION

The present invention generally relates to methods and equipment for performing size reduction operations on products, including but not limited to food products.

Various types of equipment are known for reducing the size of products, for example, slicing, strip-cutting, dicing, shredding, and/or granulating food products. A particular example is the DiversaCut 2110® manufactured by Urschel Laboratories, aspects of which are disclosed in patent documents including U.S. Pat. Nos. 3,472,297 and 3,521,688. The DiversaCut 2110® is adapted to uniformly slice, strip-cut, and/or dice a wide variety of vegetables, fruits, and meat products at high production capacities.

A portion of a DiversaCut machine is depicted in FIG. 1 as an apparatus 10 comprising a casing (or cutting head) 12 that encloses an impeller 14. Food product 16 is delivered through a feed hopper (not shown) to the impeller 14 as the impeller 14 rotates on a horizontal axis within the casing 12. Centrifugal force holds the product 16 against the inner wall of the casing 12 as paddles 20 of the impeller 14 carry the product 16 past a slicing knife 22 mounted on the casing 12 and oriented roughly parallel to the axis of the impeller 14. An adjustable slice gate 18 located upstream of the slicing knife 22 defines a gate opening, through which the product 16 is able to move radially outward before encountering the edge of the knife 22, where a single slice 24 is produced from each individual product 16 with each rotation of the impeller 14. The thickness of each slice 24 is determined by the gate opening, and more particularly the radial distance between the cutting edge of the slicing knife 22 and the adjacent edge of the slice gate 18. In the embodiment shown, the slices 24 enter circular knives 26 as they radially emerge from the gate opening, with the result that each slice 24 is cut into multiple parallel strips 28 as the slice 24 continues to travel under the momentum originally induced by the impeller 14. If diced, shredded, or granulated food products are desired, the strips 28 then pass directly into a rotating knife assembly 30 equipped with crosscut knives 32 that make a transverse cut to produce a reduced-size product 34 (e.g., diced), which is then discharged from the apparatus 10 through a discharge chute 36.

As evident from FIG. 1, the circular and crosscut knives 26 and 32 are located outside the casing 12, and therefore engage the food product 16 after slices 24 cut from the product 16 have been produced by the slicing knife 22. The slices 24, strips 28, and product 34 are all examples of reduced-size products that can be produced with a DiversaCut machine of the type represented by the apparatus 10 depicted in FIG. 1.

Although the above-described methods and equipment are useful for many size reduction applications, there is an ongoing desire to perform size reduction operations on various products of different types and shapes, including but not limited to food products. A particular example is elongate food products (i.e, an aspect ratio (width to length) of less than one) that preferably undergo orientation during their delivery to a slicing knife so that the slicing knife can make a longitudinal cut through the product. Notable but nonlimiting examples include the types of cuts made in green beans, such as French-cut beans, European-style cut beans. etc.

BRIEF DESCRIPTION OF THE INVENTION

The present invention provides machines and methods suitable for performing cutting operations on a product to yield a reduced-size product, for example, slicing elongate food products and optionally also strip-cutting, dicing, shredding, and/or granulating such food products.

According to a one aspect of the invention, a machine includes a casing comprising a circumferential wall and a slicing knife disposed in the wall. The machine further includes an impeller adapted for rotation within the casing about the axis thereof to cause a product within an interior of the impeller to be held by centrifugal force against the wall of the casing as the product is carried past the slicing knife to form a cut through the product during a rotation of the impeller. The impeller comprises annular-shaped cavities that are parallel to each other within the impeller and paddles oriented transverse to the annular-shaped cavities to define within each annular-shaped cavity a circumferential series of pockets that are circumferentially oriented with respect to the casing so that the product is circumferentially oriented with respect to the casing and the cut through the product is a first longitudinal cut and a substantially longitudinally sliced product is produced. The machine also includes a feed unit adapted to simultaneously deliver a plurality of the product to the annular-shaped cavities of the impeller. The feed unit comprises a feed chute unit that defines multiple feed troughs and has a feed chute extension that protrudes into the interior of the impeller. The feed chute extension comprises feed chutes that are aligned with the annular-shaped cavities of the impeller.

According to another aspect of the invention, a method is provided for reducing the size of products. The method entails simultaneously delivering the products to annular-shaped cavities of a rotating impeller that has an axis of rotation. The products are simultaneously delivered with a feed unit comprising a feed chute unit that defines multiple feed troughs and has a feed chute extension that protrudes into an interior of the impeller. The feed chute extension comprises feed chutes that are aligned with the annular-shaped cavities of the impeller and direct the products to circumferential series of pockets within the annular-shaped cavities. The products are circumferentially oriented by the pockets with respect to the impeller, and are held within the pockets by centrifugal force as the products are carried past a slicing knife to form a first longitudinal cut through each of the products during a rotation of the impeller and to produce therefrom a substantially longitudinally sliced product.

Machines and methods as described above are useful for various size reduction applications, including but not limited to elongate food products such as green beans that must be oriented prior to and during slicing with a slicing knife to make one or more longitudinal cuts through individual beans.

Other aspects and advantages of this invention will be better appreciated from the following detailed description.

BRIEF DESCRIPTION OF THE DRAWINGS

FIG. 11 is a view similar to FIG. 10, but with the impeller removed to further reveal the slicing unit.

DETAILED DESCRIPTION OF THE INVENTION

FIGS. 2 through 13C depict a machine 110 and components thereof in accordance with a nonlimiting embodiment of the present invention. The machine 110 and certain of its components are similar in general construction to the machine 10 and components represented in FIG. 1. In view of these similarities, the following discussion will focus primarily on certain aspects of the machine 110, whereas other aspects not discussed in any detail may be, in terms of structure, function, materials, etc., essentially as was described for the machine 10 represented in FIG. 1. In FIGS. 2 through 13C, consistent reference numbers are used to identify elements that are the same or functionally equivalent to elements shown in FIG. 1, but with the numerical prefix "1" added.

Figure 1:
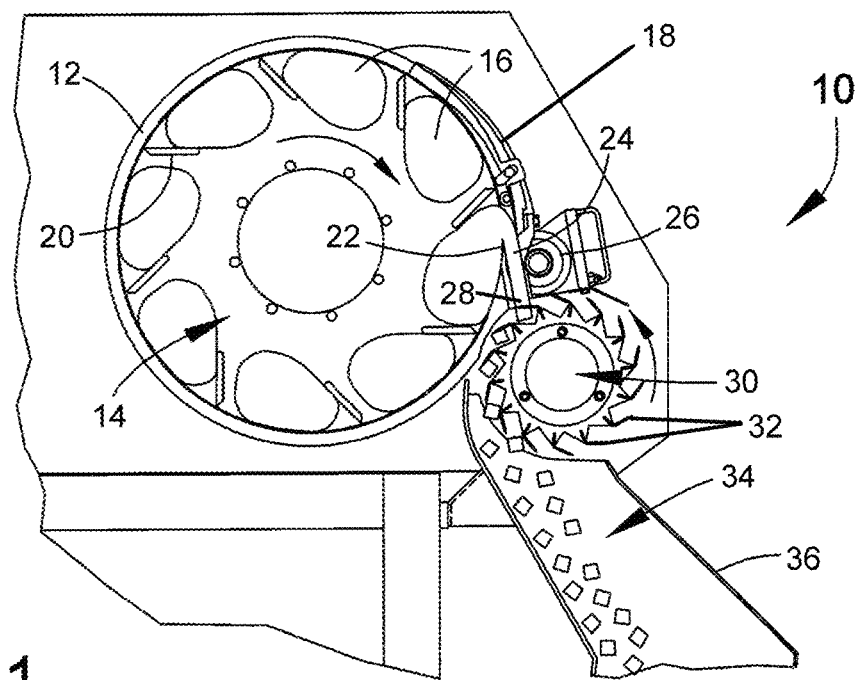
FIG. 1 is a fragmentary view of a machine adapted to perform cutting operations on a product to yield a reduced-size product, for example, sliced, strip-cut, and crosscut (e.g., dicing, shredding, or granulating) products.
Figure 3:
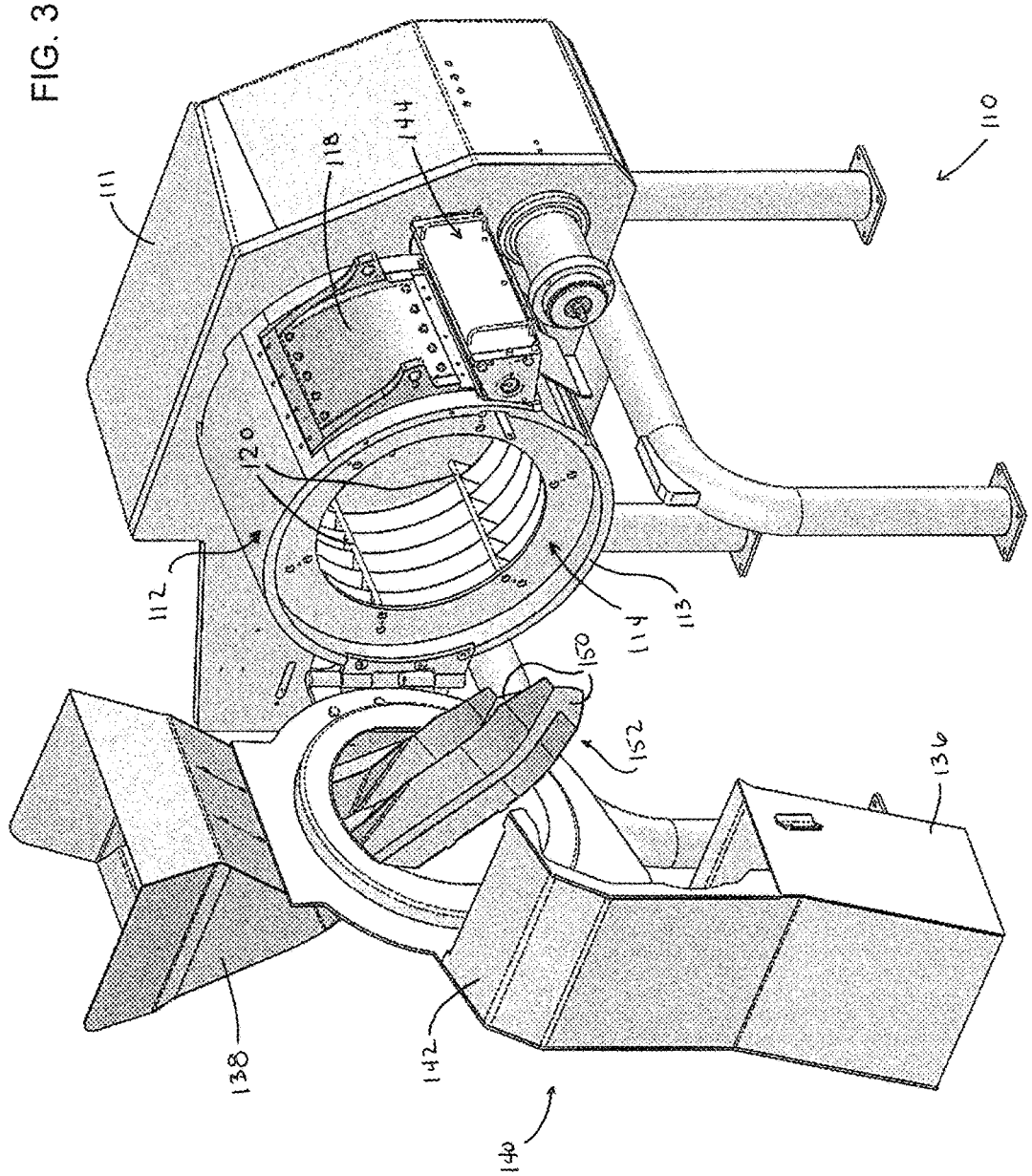
FIG. 3 represents the machine of FIG. 2 with a closure unit thereof pivoted to an open position to expose a casing and impeller of the machine.
Figure 4:
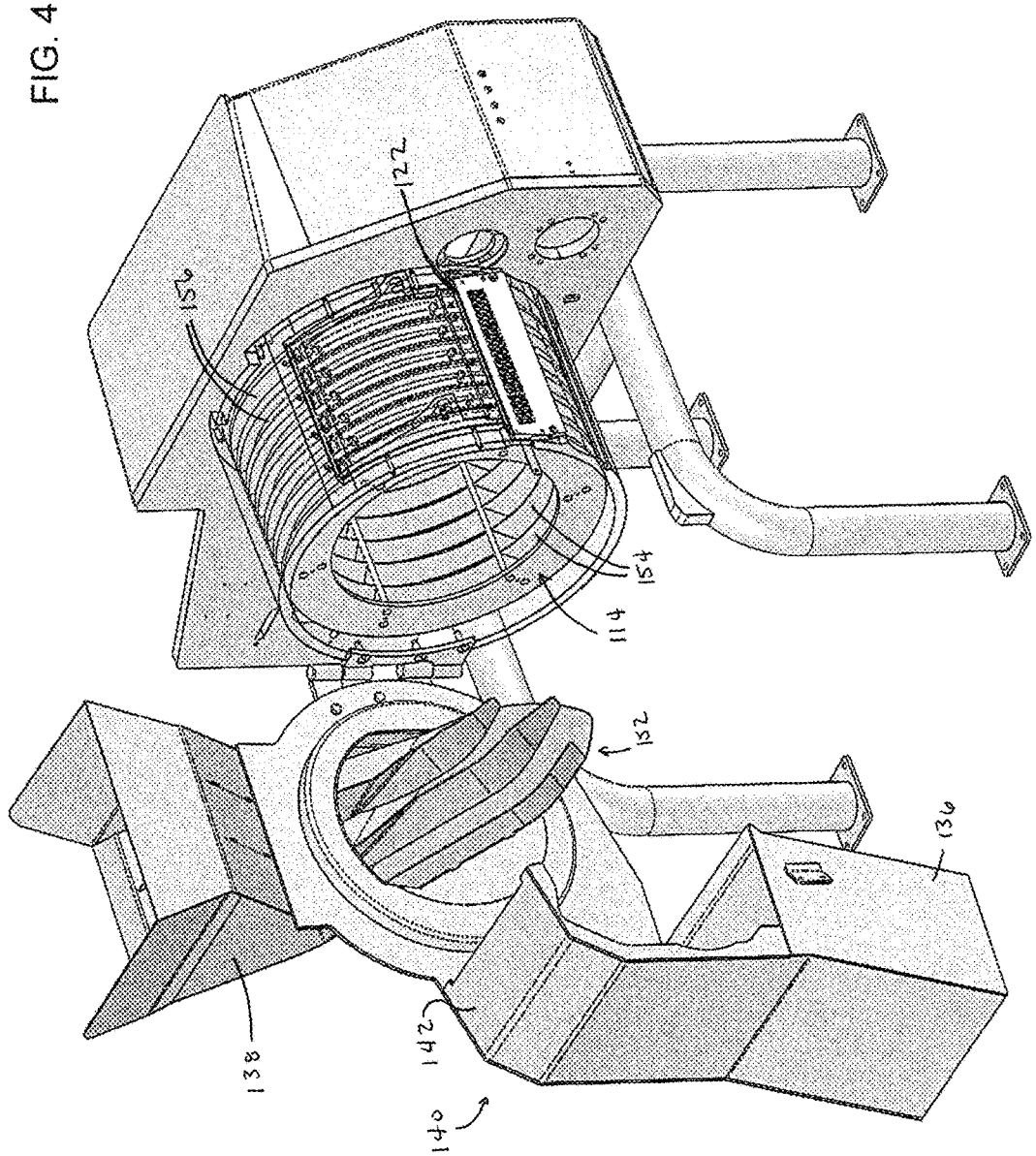
FIG. 4 is a view similar to FIG. 3, but with a portion of the casing shown in phantom to further reveal the impeller and with a strip-cut unit removed to reveal a slicing unit of the machine.

As with the machine 10 of FIG. 1, the machine 110 can be seen in FIG. 3 as including an annular-shaped casing (or cutting head) 112 and an annular-shaped impeller 114 that rotates within the casing 112 on a horizontal axis. The impeller 114 may be driven by an electric motor (not shown) encased within an enclosure 111 of the machine 110. The impeller 114 is enclosed and coaxially mounted within the casing 112, which defines a stationary housing for the impeller 114. On the basis of this coaxial arrangement about the rotational axis of the impeller 114, relative terms including but not limited to "axial," "circumferential," "radial," etc., and related forms thereof may be used below to describe the nonlimiting embodiment represented in the drawings, and such relative terms are intended to indicate the construction and relative orientations of components and features of the machine 110.

Figure 8:
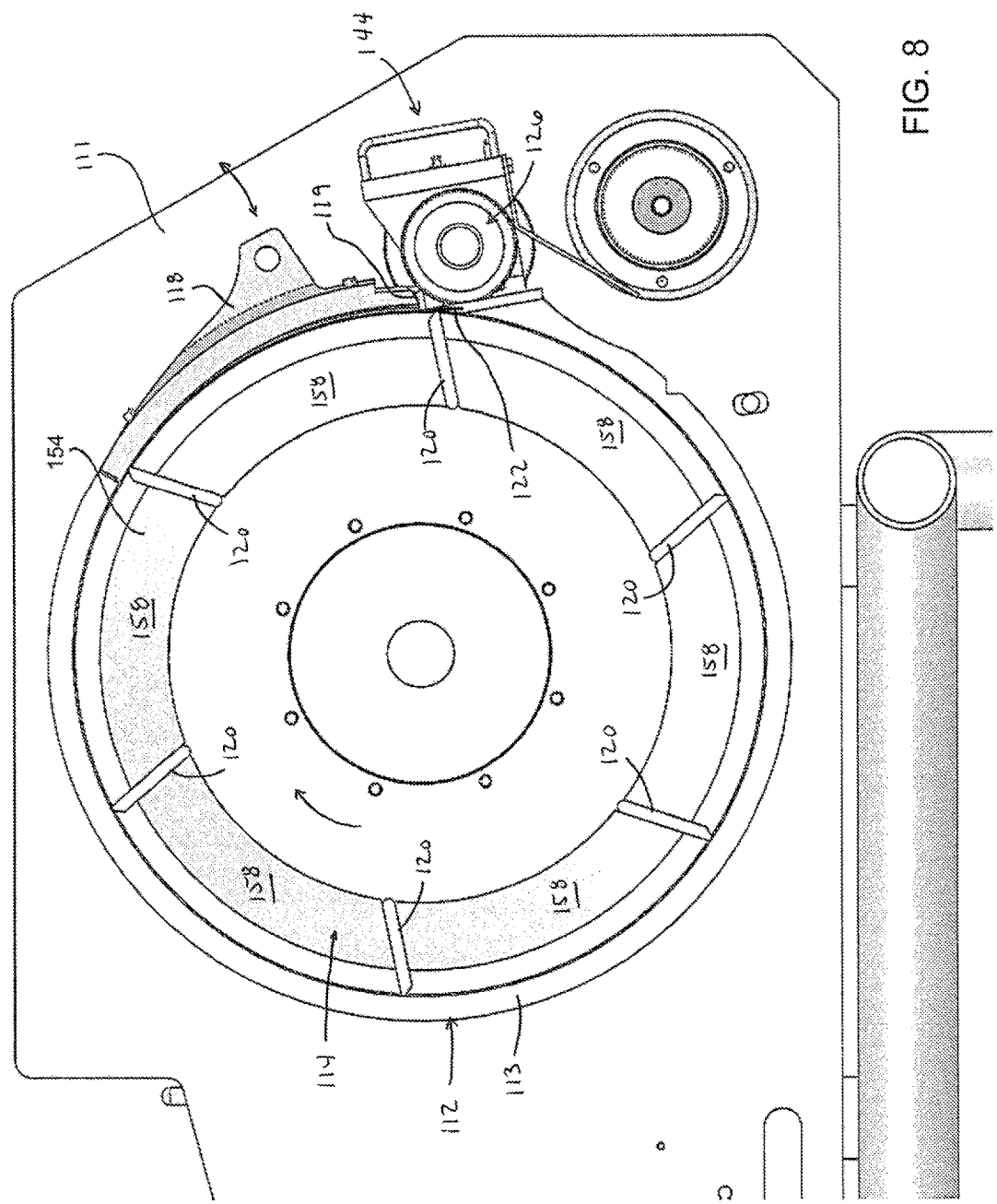
FIG. 8 is a side view of a portion of the machine taken from FIG. 3, showing the casing, impeller, slicing unit, and strip-cut unit of the machine.
Figure 9:
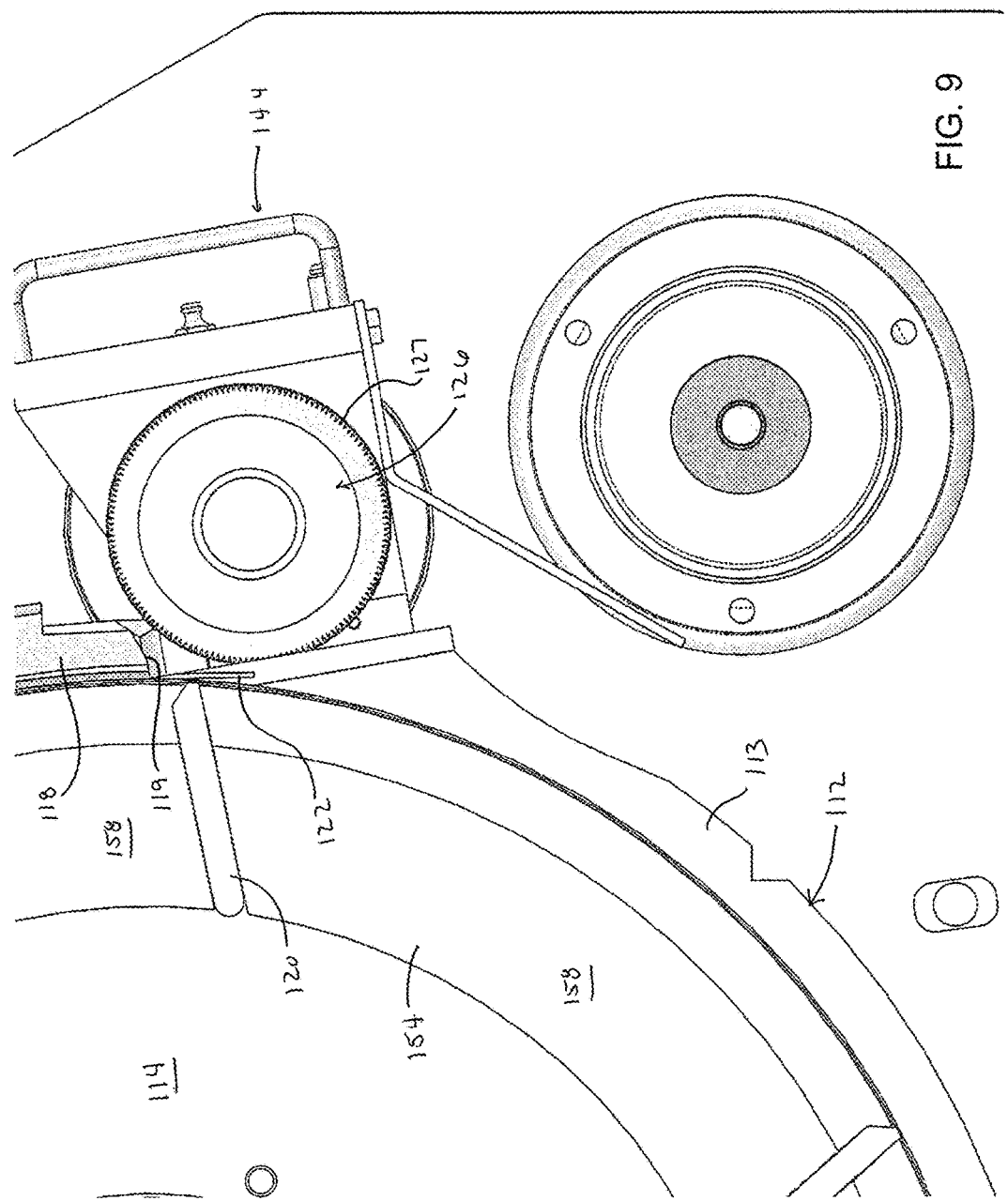
FIG. 9 is a more detailed side view of the slicing and strip-cut units of FIG. 8.
Figure 10:
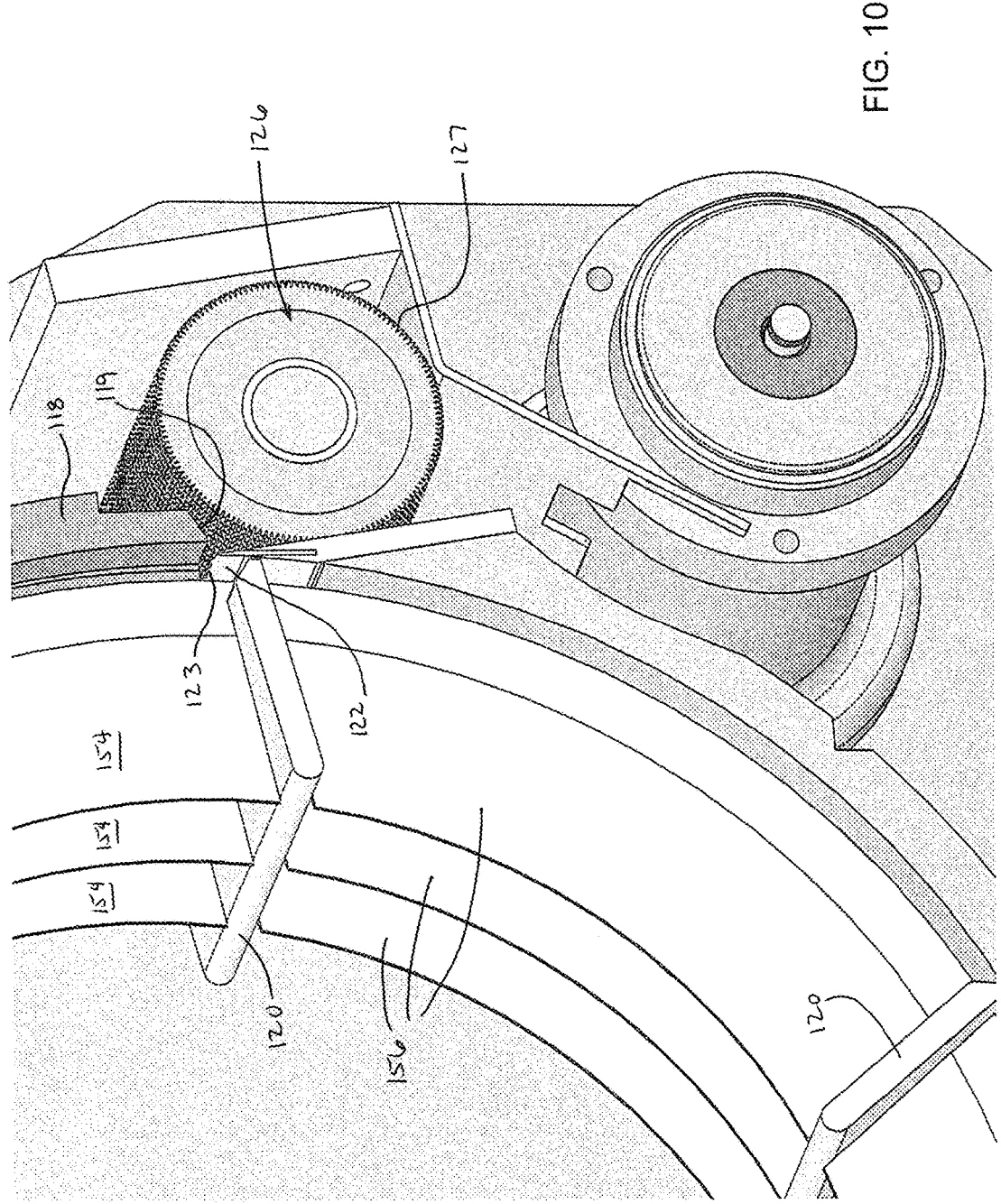
FIG. 10 is a detailed perspective view of the slicing and strip-cut units of the machine of FIGS. 2 through 9.
Figure 12A:
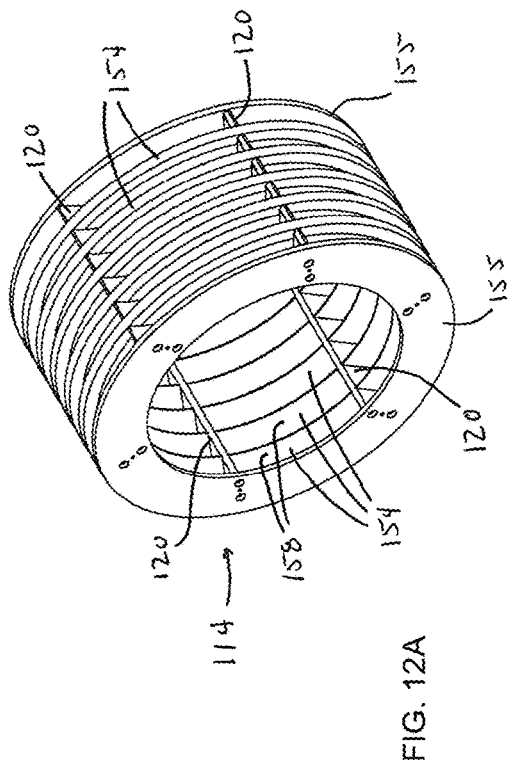
FIGS. 12A, 12B, and 12C are isolated views of the impeller of the machine of FIGS. 2 through 11.
Figure 12B:
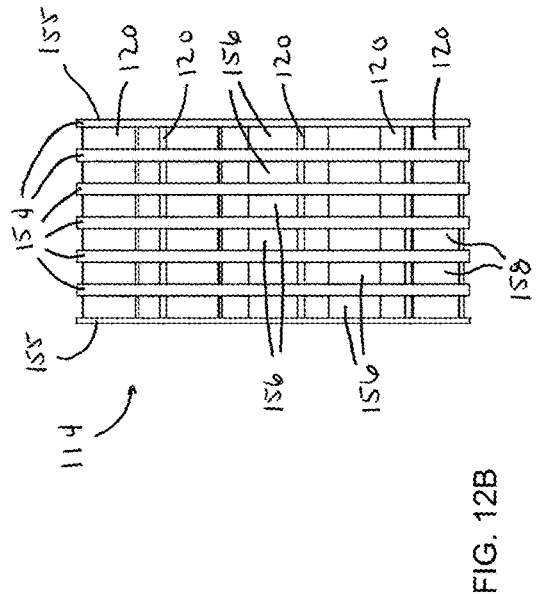
Figure 12C:
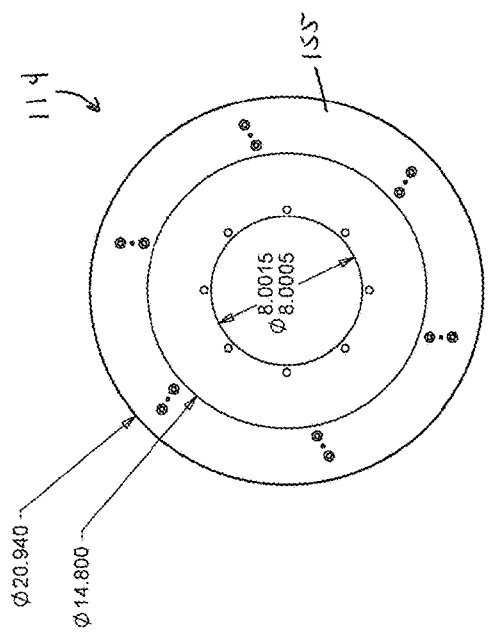
Figure 13A:
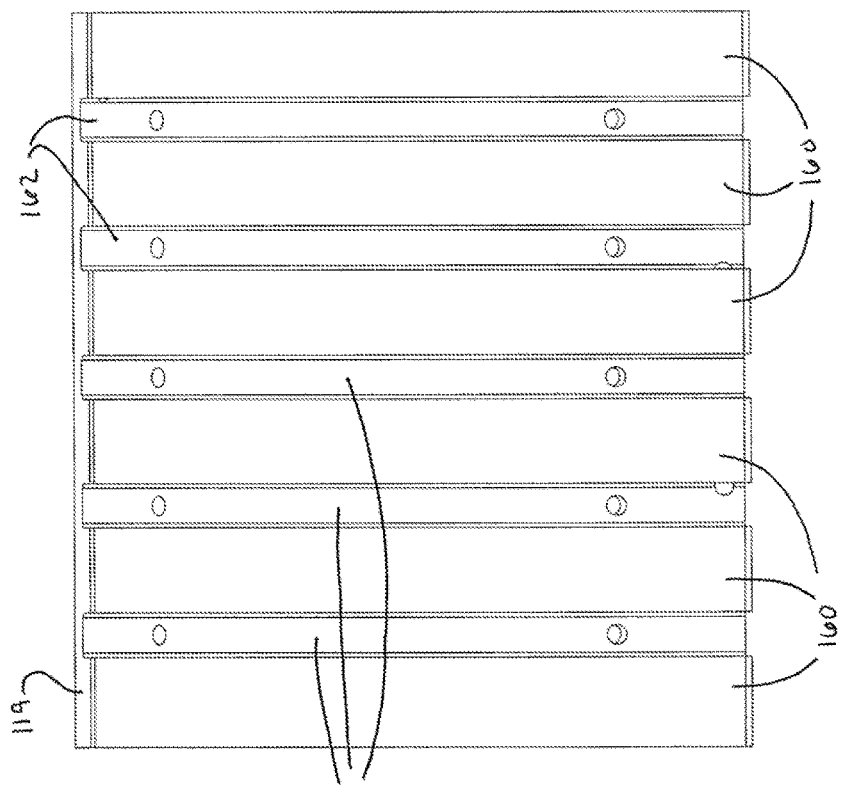
FIGS. 13A, 13B, and 13C are isolated views of a slice gate of the machine of FIGS. 2 through 11.
Figure 13B:
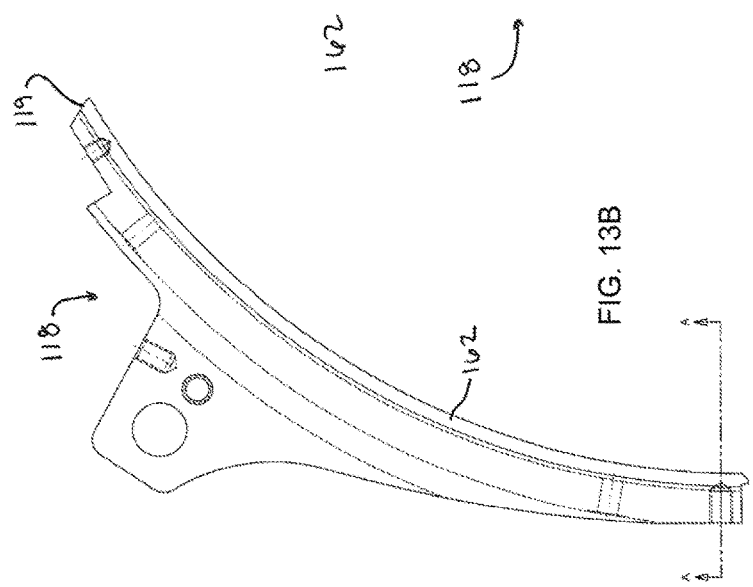
Figure 13C:
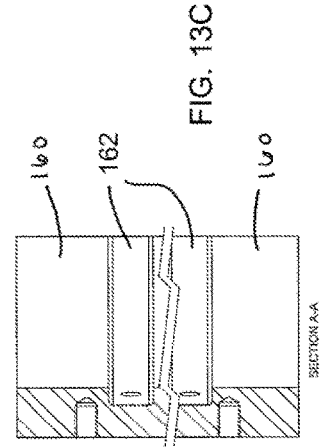

The impeller 114 has an open axial end coinciding with an open axial end of the casing 112 through which product is able to enter the impeller 114, and a number of axially-orientated, circumferentially-spaced paddles 120 that are mounted near the perimeter of the impeller 114 so as to be adjacent a circumferential wall 113 of the casing 112. As seen in FIG. 8, the paddles 120 may be inclined relative to radials of the impeller 114 in a direction opposing the rotational direction of the impeller 114. The circumferential wall 113 of the casing 112 defines a circumferential opening that is partially closed by a slice gate 118. The slice gate 118 defines an outlet or gate opening through which product is able to exit the impeller 114, and the size of the gate opening is adjustable by pivoting the slice gate 118 toward and away from the casing 112.

With the arrangement described above, as the impeller 114 rotates in a clockwise direction (as viewed in FIGS. 2-4 and 8-11), the paddles 120 capture product introduced into the impeller 114 through its open axial end, and centrifugal forces produced by rotation of the impeller 114 cause the product to be urged radially outward into engagement with the circumferential wall 113 of the casing 112. The impeller paddles 120 carry the product past a slicing knife 122 that is mounted on the casing 112 and oriented roughly parallel to the axes of the casing 112 and impeller 114. The adjustable slice gate 118 is located upstream of the slicing knife 122 and allows the product to move outward across the edge of the knife 122 to produce a single slice from each individual product with each rotation of the impeller 114. The slice gate 118 and slicing knife 122 are effectively components of a slicing unit of the machine 110, which performs a first cutting operation on products that have been introduced into the impeller 114. The thickness of each slice is determined by the radial distance between the cutting edge 123 of the slicing knife 122 (FIGS. 10 and 11) and an adjacent gate edge 119 of the slice gate 118 (FIGS. 8-11).

From the slicing knife 122, the nonlimiting embodiment of FIGS. 2-11 represents the slices as entering an array of circular knives 126 as the slices emerge from the slicing knife 122, with the result that each slice is cut into multiple parallel strips as the slice continues to travel under the momentum originally induced by the impeller 114. The circular knives 126 are preferably oriented perpendicular to the slicing knife 122 so as to make parallel longitudinal cuts through the slices, in some cases through each slice, resulting in the production of reduced-size strip-cut products, which are then discharged from the machine 110 through a discharge chute 136. As with the impeller 114, the circular knives 126 may be driven by an electric motor (not shown) encased within the enclosure 111 of the machine 110.

FIGS. 2 through 6 represent the machine 110 as having a feed hopper 138, which delivers product to the impeller 114 as the impeller 114 rotates within the casing 112. In the nonlimiting embodiment represented, the feed hopper 138 is part of a closure unit 140 that further includes the discharge chute 136 and a cover 142 for the slicing and circular knives 122 and 126. As evident from FIG. 3, the closure unit 140 is pivotally mounted to the machine 110, so that an open position of the unit 140 exposes, among other things, the casing 112, impeller 114, and a strip-cut unit 144 that comprises the circular knives 126.

Figure 2:
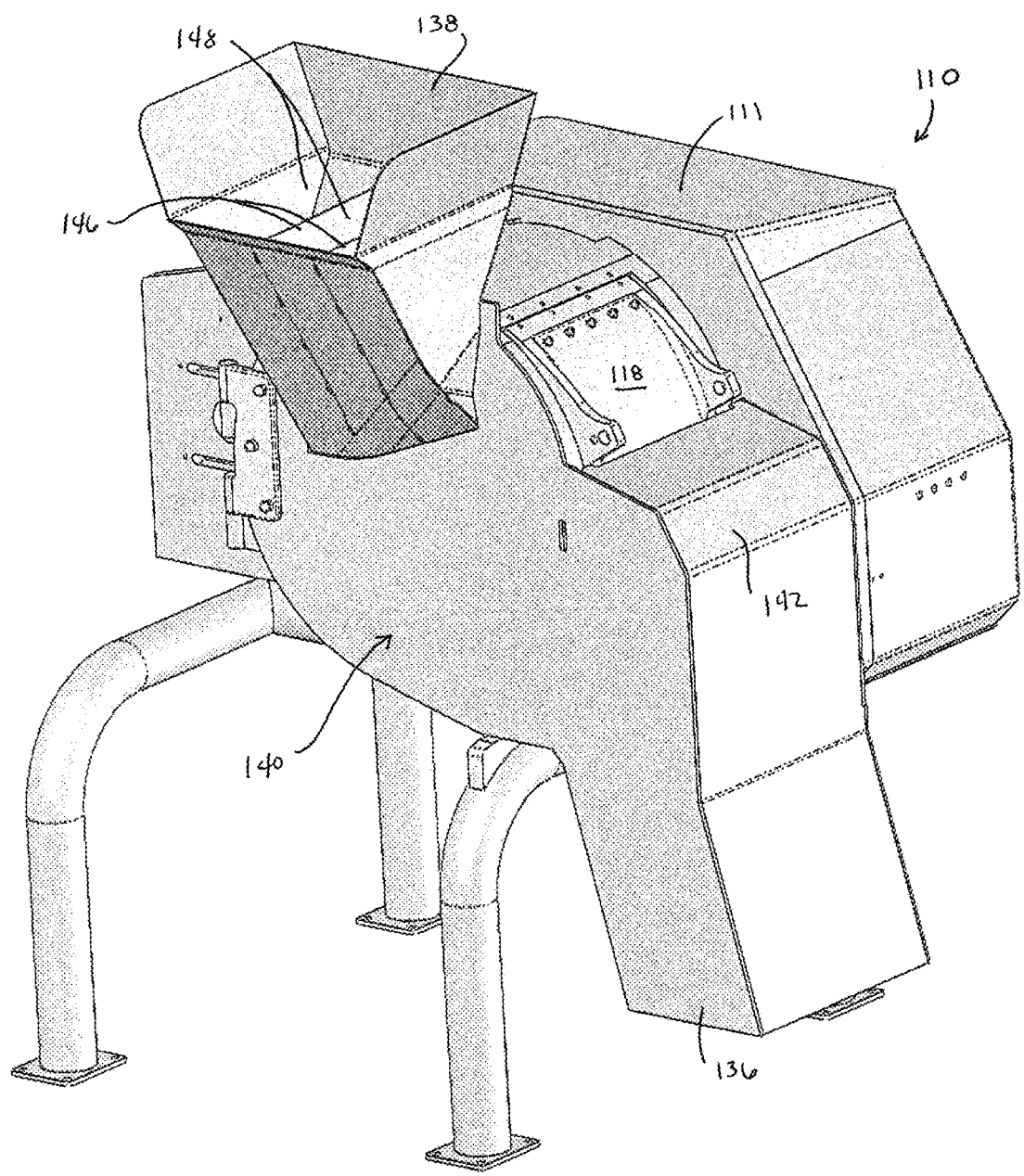
FIG. 2 represents a machine similar to that of FIG. 1, but adapted to perform longitudinal slicing operations on elongate products to yield reduced-size products.
Figure 5:
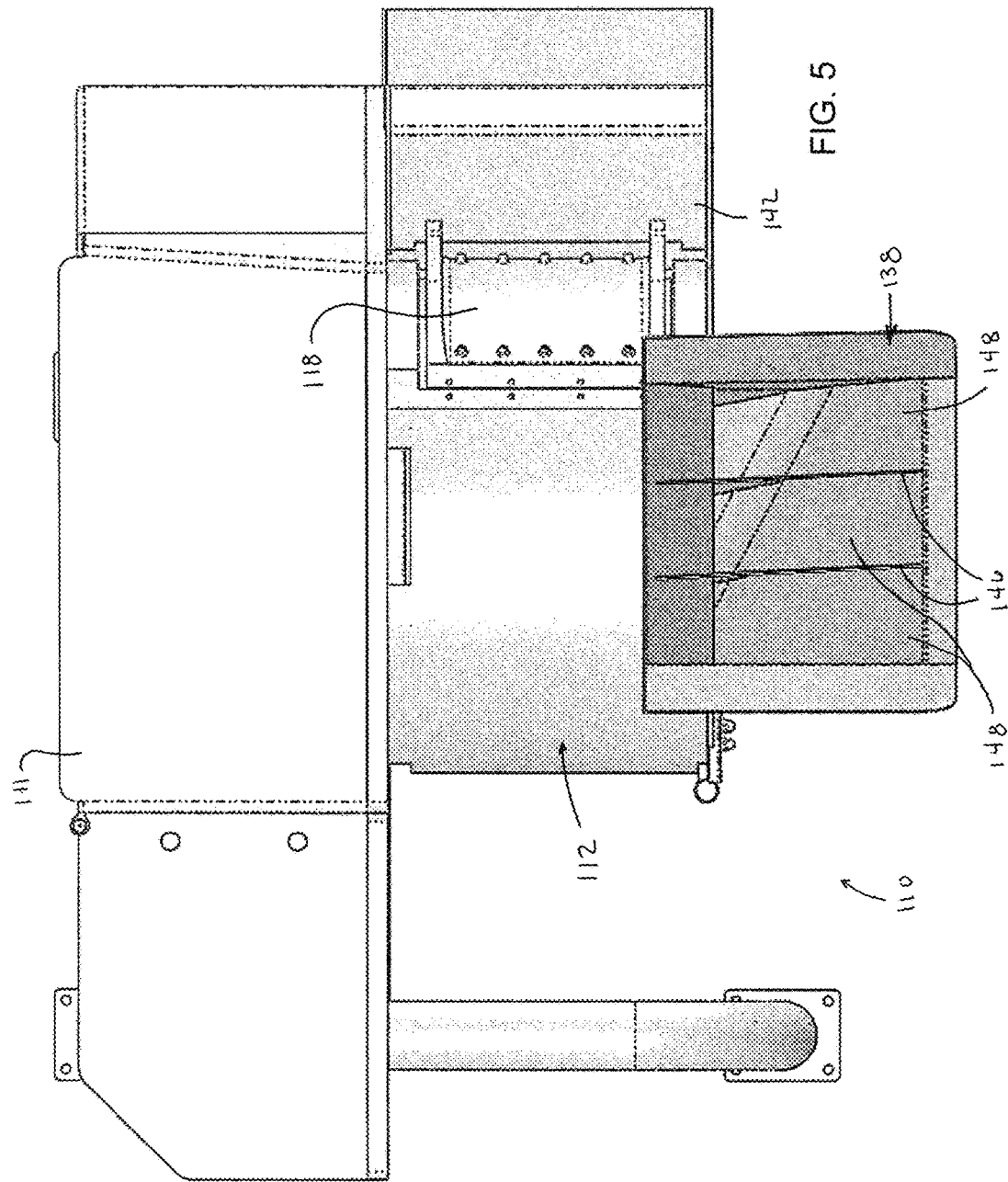
FIG. 5 is a top view of the machine of FIG. 2.
Figure 6:
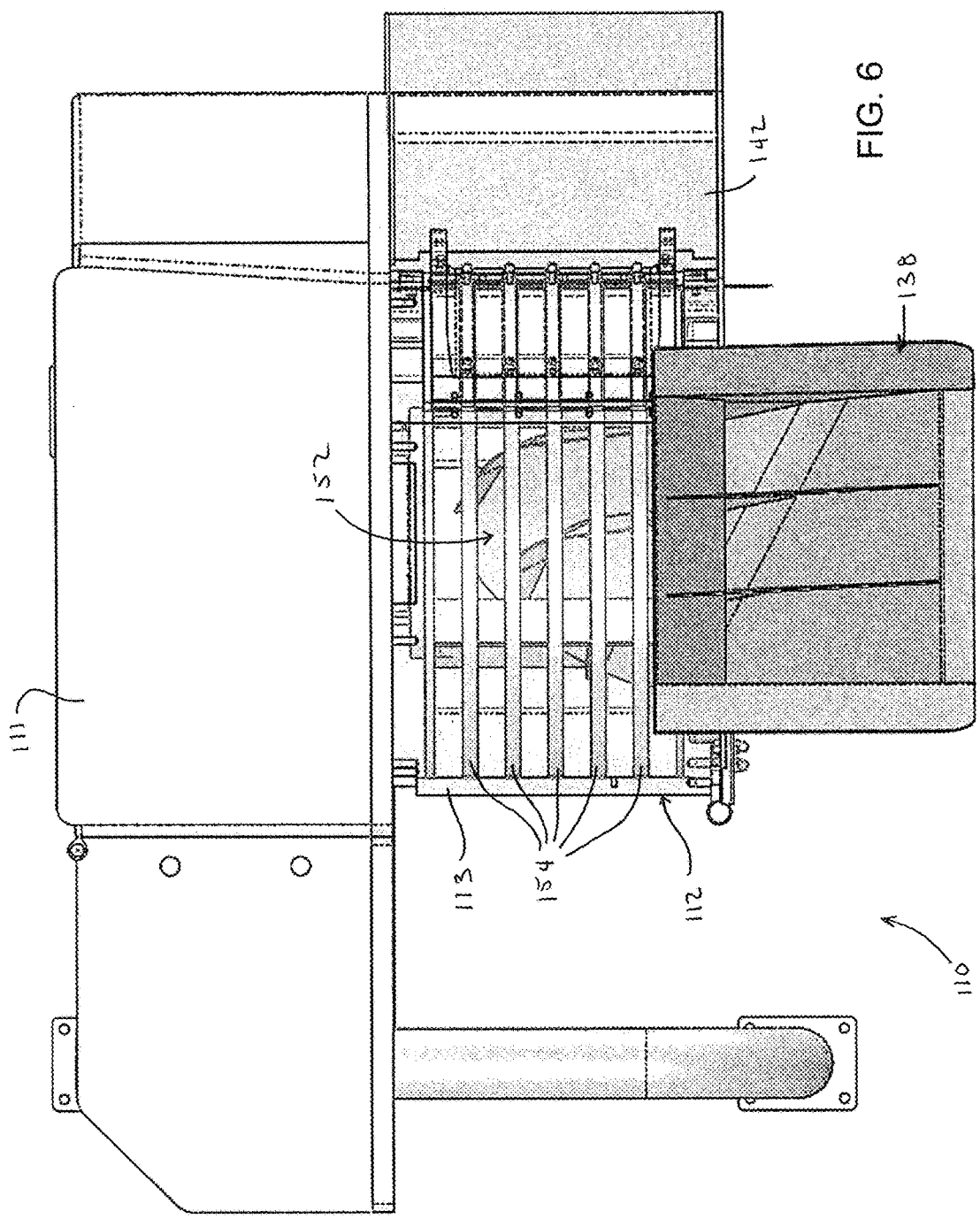
FIG. 6 is a view similar to FIG. 5, but with a portion of the casing shown in phantom to reveal the impeller of the machine.
Figure 7:
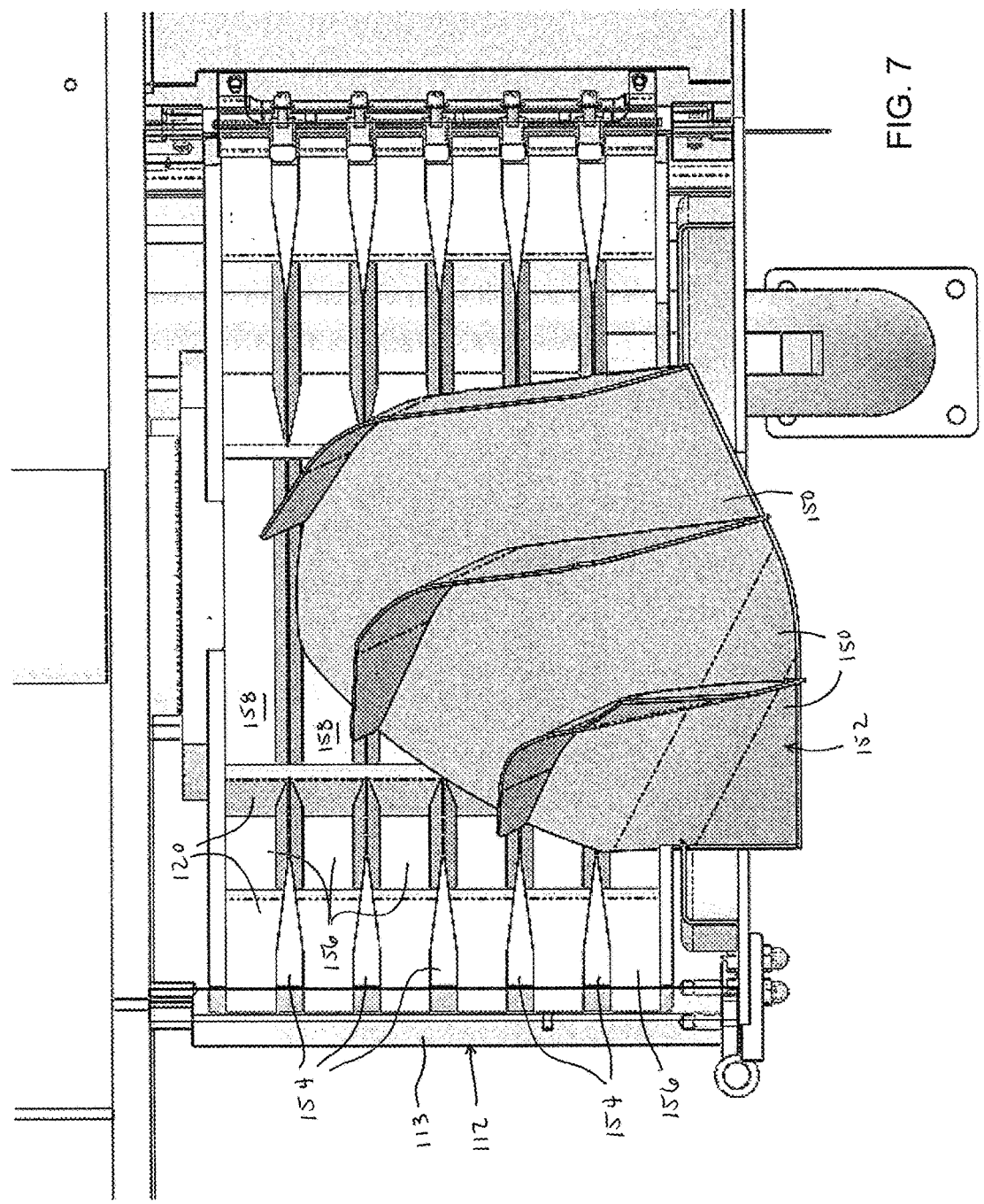
FIG. 7 is a top view of the interior of the casing of the machine of FIGS. 2 through 6, revealing the impeller and a portion of a feed chute of the machine.

As evident from FIGS. 2, 5 and 6, the feed hopper 138 includes dividers 146 that define multiple feed passages 148 within the feed hopper 138. Each feed passage 148 communicates with a separate feed chute 150, which are part of a feed chute unit 152 that projects into the interior of the impeller 114 when the closure unit 140 is in a closed position represented in FIGS. 2 and 5 through 7. As evident from FIGS. 3, 4, 6, 7 and 12A-C, the impeller 114 is configured to have multiple concentric, parallel, and axially-spaced rings 154 between two end rings 155, which delineate multiple concentric, parallel, and axially-spaced annular cavities 156 (FIG. 12B) within the impeller 114. The impeller paddles 120 divide each cavity 156 into circumferentially-spaced series of pockets 158, each constituting a sector of its cavity 156 and circumferentially distributed at the perimeter of the impeller 114 so as to also be circumferentially oriented with respect to the casing 112. In the nonlimiting embodiment shown in the drawings, six impeller paddles 120 are equi-angularly distributed on the impeller 114, such that each pocket 158 extends about sixty degrees in the circumferential direction of the impeller 114. Also in the embodiment shown in the drawings, five rings 154 define six cavities 156 with the end rings 155, and FIGS. 6 and 7 show three feed chutes 150 with each chute 150 delivering product to the pockets 158 of two cavities 156. The feed chutes 150 can be seen in FIGS. 3, 4, 6 and 7 as transitioning from a direction roughly parallel to the axis of the impeller 114 (and therefore perpendicular to the annular cavities 156 of the impeller 114), to a direction that more nearly coincides with the circumferential direction of the impeller 114 and therefore more nearly parallel to the annular cavities 156 of the impeller 114. In the nonlimiting embodiment shown in the drawings, the feed chutes 150 are oriented about 30 degrees from the circumferential direction of the impeller 114 and its cavities 156, such that the rings 154 of the impeller 114 perform the final alignment of products within the cavities 156 and their pockets 158.

In view of the above, as the impeller 114 rotates, products placed in the hopper 138 are distributed by the dividers 146 among the feed passages 148 of the hopper 138 and thereafter delivered and distributed by the feed chutes 150 among the pockets 158 of the annular cavities 156 of the impeller 114, after which the paddles 120 effectively push the products through the slicing knife 122. The distance between the knife 122 and the adjacent downstream gate edge 119 of the slice gate 118 defines the gate opening of the casing 112, and as previously noted the width of the gate opening can be adjusted by repositioning the gate 118 relative to the casing 112, for example, by pivoting the gate 118 toward and away from the casing 112. The thickness of each slice is determined by the gate opening, and therefore can be modified by making adjustments with the slice gate 118.

As most readily seen in FIGS. 11, 13A, 13B and 13C, channels 160 are defined in the surface of the slice gate 118 facing the impeller 114. The channels 160 are parallel to each other and circumferentially oriented with respect to the casing 112. The channels 160 are represented as being defined by ribs 162 that protrude from the surface of the gate 118 toward the impeller 114. In the nonlimiting embodiment shown in the drawings, five ribs 162 define six channels 160, with each channel 160 being individually circumferentially aligned with only one of the annular cavities 156 of the impeller 114. As such, a product (or multiple products) located in and circumferentially aligned by a pocket 158 of a cavity 156 is guided to one of the circumferentially-aligned channels 160, and then remains circumferentially aligned by the channel 160 before and during engagement with the slicing knife 122.

Figure 14A:
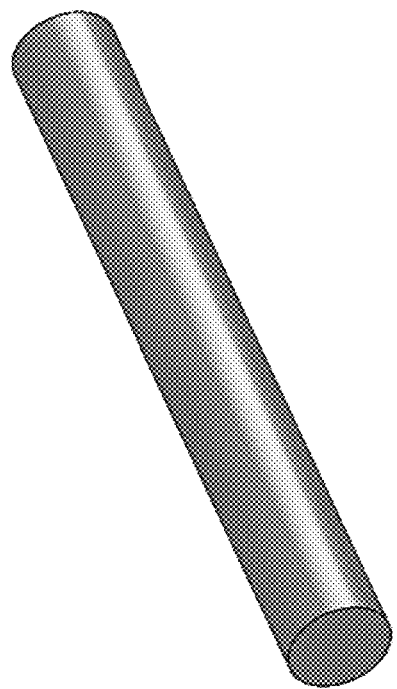
FIGS. 14A, 14B, and 14C are schematic representations of initial, intermediate, and final forms, respectively, of a food product that can be processed by the machine of FIGS. 2 through 11.
Figure 14B:
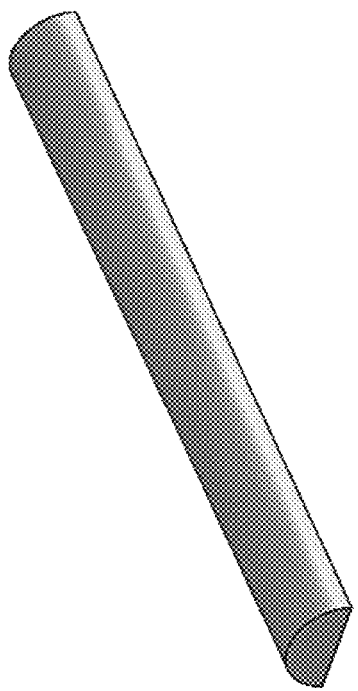

As should be evident from the descriptions of the feed chutes 150, pockets 158, and channels 160, an elongate product (an aspect ratio (width to length) of less than one, and particular products whose lengths are greater than the axial widths of the channels 160 and pockets 158) will be oriented during its delivery to the knife 122 by the individual and cooperative orientations of the feed chutes 150, pockets 158, and channels 160, so that the knife 122 will create a longitudinal cut through the product. Such a capability is advantageous when processing certain food products, a notable but nonlimiting example being green beans, such as schematically represented in FIG. 14A. Common types of cuts associated with green beans include French-cut beans, schematically represented in FIG. 14B, as well as other cut styles, including European-style cut beans. In the case of producing French-cut beans, the gate opening of the casing 112, determined by the distance between the knife 122 and gate edge 119 of the slice gate 118, can be adjusted with the gate 118 to be roughly one-half an average or nominal diameter of the beans supplied to the machine 110, so that the longitudinal cut produced by the slicing knife 122 roughly cuts each bean longitudinally in half, as is represented by FIG. 14B. As evident from FIGS. 10 and 11, the cutting edge 123 of the slicing knife 122 may be serrated to promote the cutting effectiveness of the knife 122, particularly when producing a longitudinal cut through a product having a relatively small aspect (width to length) ratio.

Figure 14C:
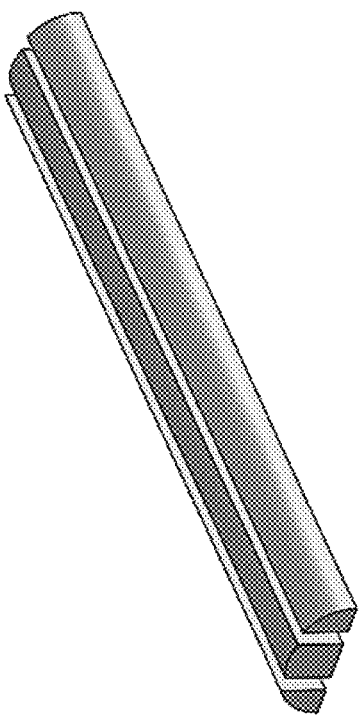

FIG. 14C represents the result of making additional longitudinal cuts through the French-cut bean of FIG. 14B. As described above, these cuts, referred to above as strip-cuts, can be created with the circular knives 126 as halved products (e.g., FIG. 14B) emerge from the slicing knife 122, with the result that each slice is cut into multiple parallel strips as each halved product continues to travel under the momentum originally induced by the impeller 114. The circular knives 126 are oriented to be roughly perpendicular to the slicing knife 122, and therefore make parallel longitudinal cuts through each halved-product to produce the reduced-size strip-cut product represented in FIG. 14C, which is then discharged from the machine 110 through the discharge chute 136. While multiple parallel longitudinal cuts are shown in the strip-cut product of FIG. 14C, a single cut or more than two cuts could be made instead. As evident from FIGS. 9 through 11, the circular knives 126 may also have serrated cutting edges 127 to promote the cutting effectiveness of the knives 126, particularly when producing longitudinal cuts through products having a relatively small aspect (width to length) ratio. Optionally, the machine 110 may be configured to perform additional processing on the strip-cut products downstream of the circular knives 126, such as with crosscut knives 32 of the type depicted in FIG. 1.

Figure 15:
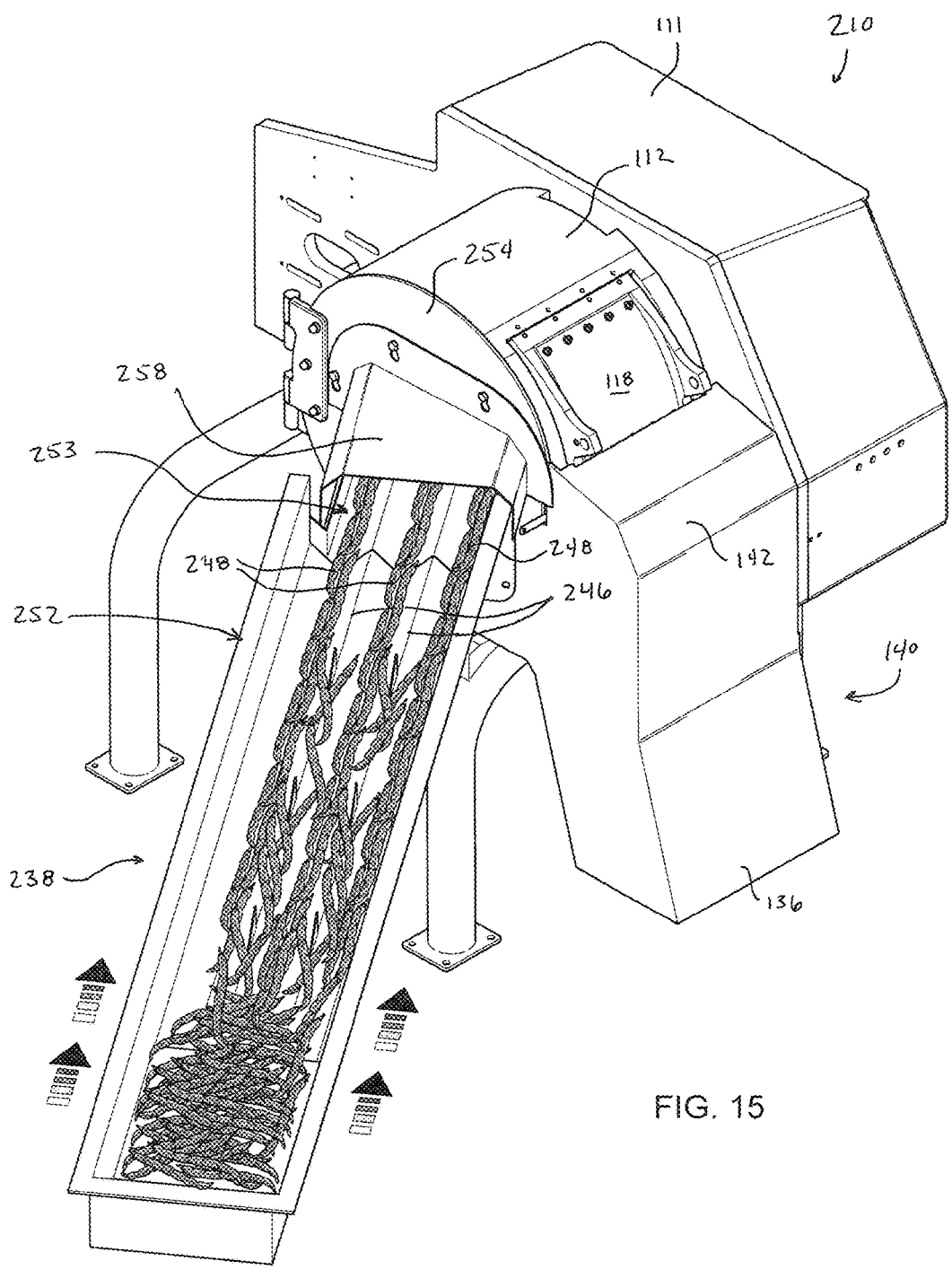
FIG. 15 represents a machine similar to that of FIG. 2, but modified to include a feed unit for delivering elongate products to the machine.
Figure 16:
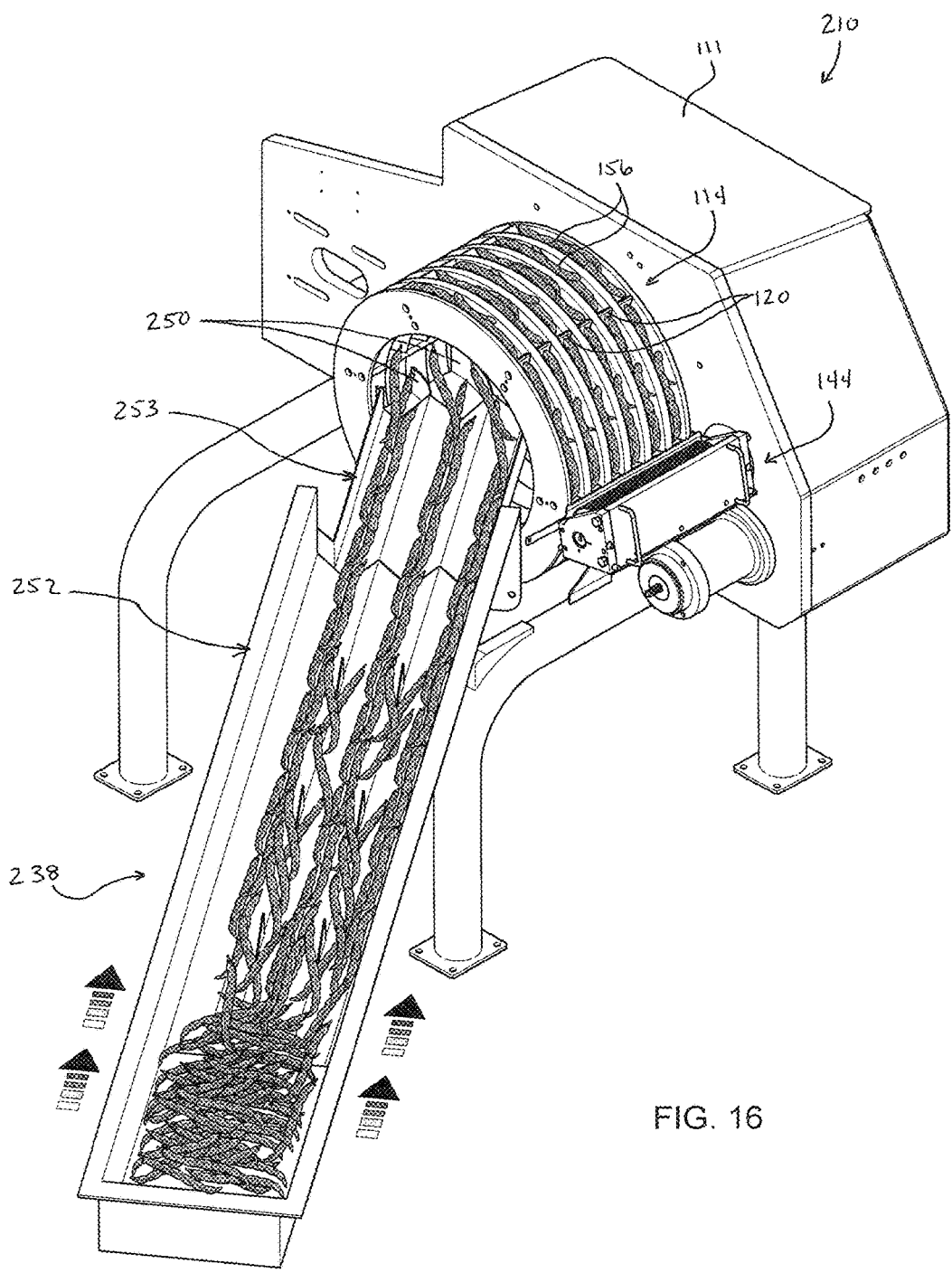
FIG. 16 represents the machine of FIG. 15 with a casing and strip-cut unit of the machine removed to reveal an impeller and slicing unit of the machine.
Figure 17:
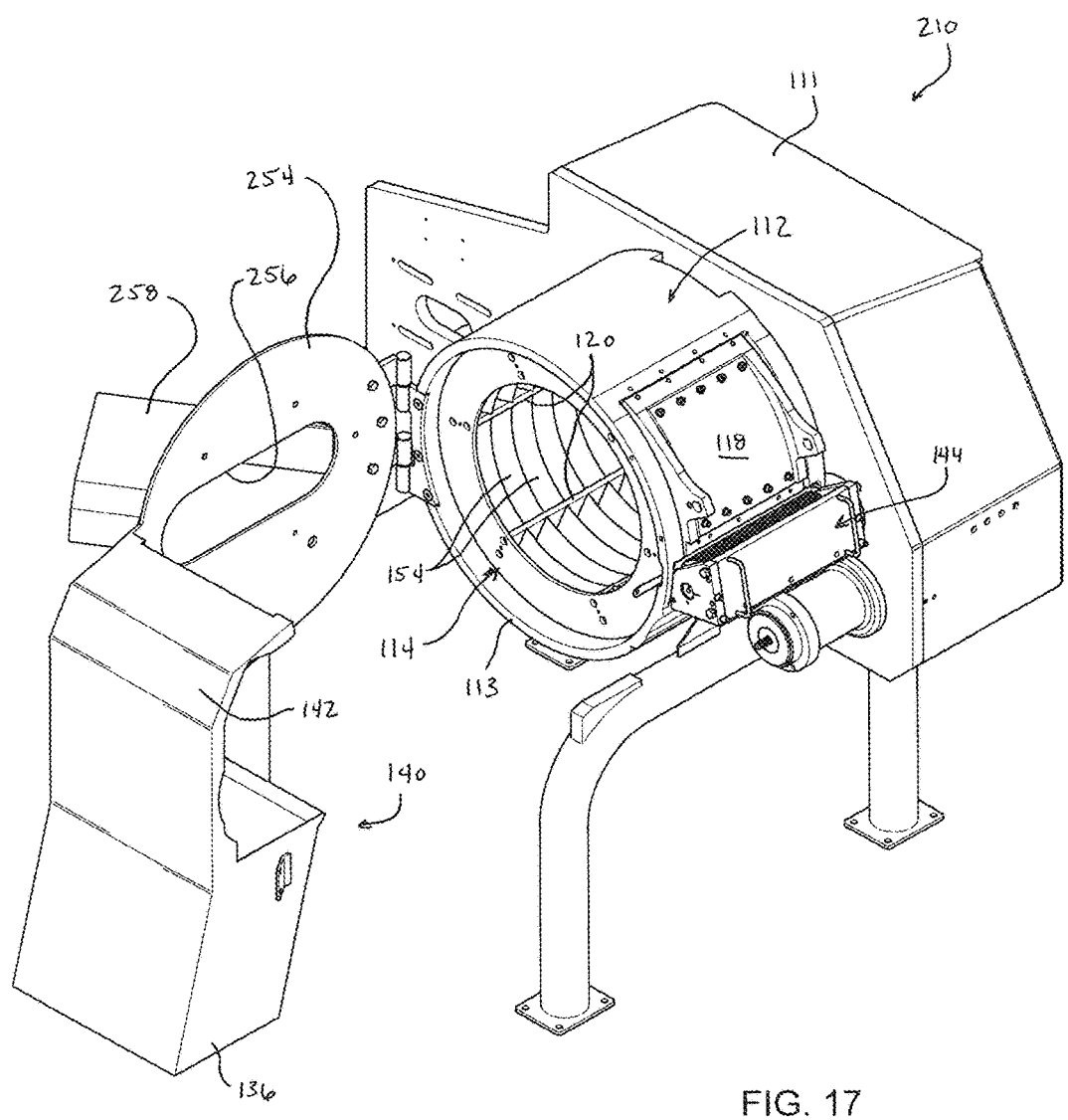
FIG. 17 is a view similar to FIG. 16, but with a closure unit thereof pivoted to an open position to expose the interior of the impeller.

FIGS. 15 through 17 depict a machine 210 and components thereof in accordance with another nonlimiting embodiment of the present invention. The machine 210 and certain of its components are similar in general construction to the machine 110 and components represented in FIGS. 2 through 13C. In view of these similarities, the following discussion will focus primarily on certain aspects of the machine 210, whereas other aspects not discussed in any detail may be, in terms of structure, function, materials, etc., essentially as was described for the machine 110 represented in FIGS. 2 through 13C. In FIGS. 15 through 17, consistent reference numbers are used to identify elements that are the same or functionally equivalent to elements shown in FIGS. 2 through 13C.

FIG. 15 represents the machine 210 as equipped with a feed unit 238, which is shown delivering elongate products (green beans) to the impeller 114 (FIGS. 16 and 17) of the machine 210 as the impeller 114 rotates within the casing 112. In the nonlimiting embodiment represented, the feed unit 238 comprises a feed chute unit 252 that includes a feed chute extension 253 that projects into the interior of the impeller 114 when the closure unit 140 is in a closed position represented in FIGS. 15 and 16. The feed chute extension 253 projects into the interior of the impeller 114 through an opening 256 (FIG. 17) in a door 254 of the closure unit 140. As a safety measure, the extension 253 and opening 256 are partially covered by a shield 258 rigidly attached to the door 254. As evident from FIG. 17, the feed chute extension 252 is similar in construction and function to the feed chute unit 152 depicted in FIGS. 3, 4, 6 and 7. The closure unit 140 and its door 254 are pivotally mounted to the machine 210 so that in its open position the closure unit 140 exposes, among other things, the casing 112, impeller 114, and strip-cut unit 144.

As evident from FIG. 15, the feed chute unit 252 and its extension 253 have aligned dividers 246 that define multiple troughs 248 along which the products flow toward the impeller 114. The troughs 248 are aligned with feed chutes 250 (FIG. 16) attached to the extension 253. As with the previous embodiment of FIGS. 2 through 13C, each feed chute 250 delivers product to the pockets 158 of multiple annular cavities 156 of the impeller 114. In the particular embodiment represented, three troughs 248 deliver product to three feed chutes 250, and each feed chute 250 delivers product to two of the six cavities 156 of the impeller 114. The troughs 248 are represented as defining linear paths that are disposed at an acute angle (i.e., less than ninety degrees but more than zero degrees) to the axis of the impeller 114. This angle is depicted as roughly forty-five degrees to the impeller axis in FIGS. 15 and 16. The feed chutes 250 define arcuate paths to perform the final alignment of products with the cavities 156 and pockets 158 of the impeller 114. The angle that products are reoriented by each feed chute 250 is preferably equal to about ninety degrees minus the acute angle of the troughs 248. In the particular embodiment of FIGS. 15 through 17 in which the angle of each trough 248 is roughly forty-five degrees, the feed chutes 250 divert the products an angle of about forty-five degrees (90°−45°).

According to a preferred aspect of the embodiment of FIGS. 15 through 17, the feed unit 238 includes a vibratory shaker (not shown) so that products dropped on or delivered en mass to the feed unit 238 become oriented parallel to the troughs 248 of the feed chute unit 252 before being delivered to the feed chutes 250. FIGS. 15 and 16 indicate the primary vibrational motion as parallel to the troughs 248, though other primary or secondary vibrational motions could also be utilized.

In view of the above, as the impeller 114 rotates, products placed in the feed unit 238 are distributed by the dividers 246 among the feed troughs 248 of the unit 238 and are thereafter delivered and distributed by the feed chutes 250 among the pockets 158 of the annular cavities 156 of the impeller 114, after which the paddles 120 effectively push the products through the slicing knife 122. As previously discussed in reference to the prior embodiment, the thickness of each slice is determined by the gate opening, and therefore can be modified by making adjustments with the slice gate 118.

In addition to green beans, the machines 110 and 210 and processes performed therewith can be adapted to cut a variety of different types of food products and produce a variety of different cuts, for example, by adjusting the axial spacing of the circular knives 126 to perform one or more cuts on each individual slice produced by the slicing knife 122 and produce reduced-size strip-cut products of various different widths. It is also foreseeable that the machines 110 and 210 and their processes could be adapted to cut products other than food products. Therefore, while the invention has been described in terms of a specific embodiment, it is apparent that other forms could be adopted by one skilled in the art. For example, the physical configuration of the machines 110 and 210 and their components used therewith could differ from those shown, and various materials and processes could be used to manufacture the machines 110 and 210 and their components. Therefore, the scope of the invention is to be limited only by the following claims.

The invention claimed is:

1. A machine for cutting products, the machine comprising:
   a casing comprising a circumferential wall and a slicing knife disposed in the wall;
   an impeller within the casing and having a rotational axis about which the impeller rotates within the casing to cause a product within an interior of the impeller to be held by centrifugal force against the wall of the casing as the product is carried past the slicing knife to form a cut through the product during a rotation of the impeller, the impeller comprising multiple rings that are axially-spaced and concentric in relation to the rotational axis of the impeller to delineate multiple annular-shaped cavities within the impeller that are parallel to each other and axially-spaced and concentric relative to the rotational axis of the impeller, the impeller further comprising paddles oriented transverse to the annular-shaped cavities to define within each annular-shaped cavity a circumferential series of pockets that are circumferentially oriented with respect to the casing so that the product is circumferentially oriented with respect to the casing and the cut through the product is a first longitudinal cut and a substantially longitudinally sliced product is produced; and
   a feed unit adapted to simultaneously deliver a plurality of the product to the annular-shaped cavities of the impeller, the feed unit comprising a feed chute unit that defines multiple feed troughs, the feed chute unit comprising a feed chute extension that protrudes into the interior of the impeller, the feed chute extension comprising feed chutes that are each configured to deliver a portion of the product to at least one of the annular-shaped cavities of the impeller.

2. The machine according to claim 1, wherein the multiple feed troughs define linear paths that are disposed at an acute angle to the rotational axis of the impeller.

3. The machine according to claim 2, wherein the feed chutes define arcuate paths to perform a final alignment of the products with the annular-shaped cavities of the impeller.

4. The machine according to claim 3, wherein the products are reoriented by each feed chute an angle equal to about ninety degrees minus the acute angle of the multiple feed troughs.

5. The machine according to claim 1, wherein each of the feed chutes is aligned with one of the multiple feed troughs.

6. The machine according to claim 1, wherein each of the feed chutes is aligned with more than one of the annular-shaped cavities of the impeller.

7. The machine according to claim 1, wherein the feed unit is a vibrating feed unit.

8. The machine according to claim 1, wherein the casing further comprises a circumferential opening in the wall and an adjustable slice gate that partially closes the opening, the slicing knife being oriented parallel to the rotational axis of the impeller and to an adjacent edge of the slice gate to define therewith a gate opening.

9. The machine according to claim 8, wherein the slice gate has a surface facing an interior of the casing and a plurality of channels defined in the surface that are circumferentially oriented with respect to the casing.

10. The machine according to claim 9, wherein each of the channels of the slice gate is individually circumferentially aligned with one of the annular-shaped cavities of the impeller.

11. The machine according to claim 1, wherein the slicing knife is configured and arranged so that the first longitudinal cut formed by the slicing knife is a halving cut and the sliced product is a substantially longitudinally-halved sliced product.

12. The machine according to claim 1, further comprising circular knives oriented substantially perpendicular to the slicing knife and adapted to form at least a second longitudinal cut through the sliced product to produce strip-cut products.

13. The machine according to claim 12, wherein the circular knives are configured and arranged so that a single second longitudinal cut is produced with the circular knives through the sliced product and the single second longitudinal cut is substantially perpendicular to the first longitudinal cut made with the slicing knife.

14. The machine according to claim 12, wherein the circular knives are configured and arranged so that a plurality of second longitudinal cuts are produced with the circular knives through the sliced product and each of the plurality of second longitudinal cuts is substantially perpendicular to the first longitudinal cut made with the slicing knife.

* * * * *